US011212869B2

(12) United States Patent
Bonnett et al.

(10) Patent No.: US 11,212,869 B2
(45) Date of Patent: Dec. 28, 2021

(54) METHODS AND SYSTEMS TO IDENTIFY SMART SENSOR LOCATIONS BY THE APPLICATION OF PHYSICAL STIMULUS

(71) Applicant: General Electric Company, Schenectady, NY (US)

(72) Inventors: Steven Bonnett, Hampshire (GB); Timothy North, Hampshire (GB); Tod Gilbert, Hampshire (GB)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 16/624,292

(22) PCT Filed: May 23, 2018

(86) PCT No.: PCT/US2018/034188
§ 371 (c)(1),
(2) Date: Dec. 18, 2019

(87) PCT Pub. No.: WO2018/236531
PCT Pub. Date: Dec. 27, 2018

(65) Prior Publication Data
US 2020/0128615 A1 Apr. 23, 2020

(30) Foreign Application Priority Data
Jun. 23, 2017 (GB) ..................... 1710099

(51) Int. Cl.
*H04W 84/18* (2009.01)
*H04W 4/38* (2018.01)
(Continued)

(52) U.S. Cl.
CPC ............ *H04W 84/18* (2013.01); *G06F 3/017* (2013.01); *H04L 67/12* (2013.01); *H04W 4/38* (2018.02); *H04W 64/003* (2013.01)

(58) Field of Classification Search
CPC ......... H04W 4/38; H04W 84/18; H04W 4/70; H04W 8/005; H04W 24/08;
(Continued)

(56) References Cited

U.S. PATENT DOCUMENTS 8,707,777 B2  4/2014 Chang et al.
9,330,316 B2  5/2016 Hicks et al.
(Continued)

FOREIGN PATENT DOCUMENTS

KR   10-1326919 B1   11/2013
WO   2018/236531 A1  12/2018

OTHER PUBLICATIONS

International Preliminary Report on Patentability received for PCT Application No. PCT/US2018/034188, dated Jan. 2, 2020, 9 pages.
(Continued)

*Primary Examiner* — Kwasi Karikari
(74) *Attorney, Agent, or Firm* — Wood IP LLC (57) ABSTRACT

Methods, apparatus, and articles of manufacture to identify and configure sensors are disclosed. Certain examples provide an apparatus including a processor and a communication interface. The example processor is configured to broadcast, using the communication interface, a request for sensor identification in a detection mode. The example processor is configured to receive, using the communication interface, sensor identification information. The example processor is configured to instruct, based on the sensor identification information, sensors to enter a monitoring mode to await a stimulus. The example processor is configured to receive, in response to a first stimulus applied to a first location, a first sensor response to the first stimulus from a first sensor. The example processor is configured to evaluate the first sensor response with respect to an expected sensor response. The example processor is configured to when the first sensor
(Continued)

response satisfies a criterion, associate the first sensor with the first location.

20 Claims, 8 Drawing Sheets (51) Int. Cl.
    *G06F 3/01*         (2006.01)
    *H04L 29/08*      (2006.01)
    *H04W 64/00*    (2009.01)

(58) Field of Classification Search
    CPC ... H04W 12/009; H04W 88/18; H04W 84/12; H04W 4/80; H04W 4/90; H04W 24/02; H04W 12/63; H04W 12/71; H04W 24/04; H04W 40/20; H04W 4/02; H04W 4/46; H04W 64/003; H04L 43/10
    See application file for complete search history.

(56) References Cited

U.S. PATENT DOCUMENTS

| | | | |
|---|---|---|---|
| 9,655,075 B2 | 5/2017 | Pierrel et al. | |
| 2008/0240160 A1* | 10/2008 | Ishii | H04W 40/246 370/475 |
| 2011/0282468 A1* | 11/2011 | Ashdown | H05B 47/10 700/90 |
| 2013/0318188 A1 | 11/2013 | Liekens et al. | |
| 2014/0213299 A1* | 7/2014 | Marti | H04W 4/38 455/456.3 |
| 2017/0126508 A1 | 5/2017 | Poleg et al. | |

OTHER PUBLICATIONS

International Search Report and the Written Opinion of the International Searching Authority from International Appl. No. PCT/US2018/034188, dated Sep. 20, 2018.

* cited by examiner

METHODS AND SYSTEMS TO IDENTIFY SMART SENSOR LOCATIONS BY THE APPLICATION OF PHYSICAL STIMULUS

FIELD OF THE DISCLOSURE

This disclosure relates generally to smart sensors and, more particularly, to methods and systems to identify smart sensor locations by the application of physical stimulus.

BACKGROUND

Smart sensors can be defined as sensors that include electronics and software to acquire, digitize, process and transmit the output of an analogue sensor all within a single unit, and offer benefits such as reduced installation cabling and simplified interfaces. Smart sensors can be used to monitor environmental conditions, such as engine operating conditions in aircraft. However, such sensors must currently be manually configured for a particular purpose. For example, sensors can be manually configured by directly disconnecting each sensor from aircraft installation wiring and manually applying a particular configuration to each sensor. Such a manual update is time-consuming and tedious and can be error prone, resulting in deficient monitoring. Erroneous values and/or lost measurements can impact system performance, safety, reliability, etc.

BRIEF DESCRIPTION OF THE DRAWINGS

The features and technical aspects of the system and method disclosed herein will become apparent in the following Detailed Description set forth below when taken in conjunction with the drawings in which like reference numerals indicate identical or functionally similar elements.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts.

BRIEF DESCRIPTION

Methods, apparatus, and articles of manufacture to identify and configure sensors are disclosed.

Certain examples provide an apparatus including a processor and a communication interface. The example processor is configured to at least broadcast, using the communication interface, a request for sensor identification in a detection mode. The example processor is configured to at least receive, using the communication interface, sensor identification information. The example processor is configured to at least instruct, based on the sensor identification information, sensors to enter a monitoring mode to await a stimulus. The example processor is configured to at least receive, in response to a first stimulus applied to a first location, a first sensor response to the first stimulus from a first sensor. The example processor is configured to at least evaluate the first sensor response with respect to an expected sensor response. The example processor is configured to at least when the first sensor response satisfies a criterion, associate the first sensor with the first location.

Certain examples provide a method including broadcasting, using a processor, a request for sensor identification in a detection mode. The example method includes receiving, using the processor, sensor identification information. The example method includes instructing, using the processor based on the sensor identification information, sensors to enter a monitoring mode to await a stimulus. The example method includes receiving, in response to a first stimulus applied to a first location, a first sensor response to the first stimulus from a first sensor. The example method includes evaluating, using the processor, the first sensor response with respect to an expected sensor response. When the first sensor response satisfies a criterion, the example method includes associating the first sensor with the first location.

Certain examples provide a tangible computer-readable storage medium including instructions. The example instructions, when executed cause the machine to at least broadcast a request for sensor identification in a detection mode. The example instructions, when executed cause the machine to at least receive sensor identification information. The example instructions, when executed cause the machine to at least instruct, based on the sensor identification information, sensors to enter a monitoring mode to await a stimulus. The example instructions, when executed cause the machine to at least receive, in response to a first stimulus applied to a first location, a first sensor response to the first stimulus from a first sensor. The example instructions, when executed cause the machine to at least evaluate the first sensor response with respect to an expected sensor response. The example instructions, when executed cause the machine to at least when the first sensor response satisfies a criterion, associate the first sensor with the first location.

DETAILED DESCRIPTION

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized and that logical, mechanical, electrical and other changes may be made without departing from the scope of the subject matter of this disclosure. The following detailed description is, therefore, provided to describe an exemplary implementation and not to be taken as limiting on the scope of the subject matter described in this disclosure. Certain features from different aspects of the following description may be combined to form yet new aspects of the subject matter discussed below.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As used herein, the terms "system," "unit," "module," "engine," etc., may include a hardware and/or software system that operates to perform one or more functions. For example, a module, unit, or system may include a computer processor, controller, and/or other logic-based device that performs operations based on instructions stored on a tangible and non-transitory computer readable storage medium, such as a computer memory. Alternatively, a module, unit, engine, or system may include a hard-wired device that performs operations based on hard-wired logic of the device. Various modules, units, engines, and/or systems shown in the attached figures may represent the hardware that operates based on software or hardwired instructions, the software that directs hardware to perform the operations, or a combination thereof.

Sensors can be used with respect to a plurality of aircraft and/or other electromechanical systems, machines, etc., to measure different values, characteristics, operating parameters, environmental conditions, etc., associated with the respective system, machine, etc. For example, sensors can measure vibration, temperature, light, etc., on an aircraft such as a helicopter, airplane, etc.

A "smart" sensor is a sensor that has one or more sensing elements (e.g., light, vibration, temperature, pressure, etc.) and electronics built in to the sensor to a) acquire an analog output from the sensing element(s) and b) interpret and/or otherwise process the analog output to generate sensing data to be distributed on a network. Thus, a smart sensor is a measuring device that combines the acquisition and processing elements into a single package.

A plurality of smart sensors may be networked together, under the control of a central control unit, to provide diagnostic coverage of a machine or system. Certain examples provide a network of uniform, homogenous, or "standard" smart sensors connected to a network including a control unit to control the sensors and address collected sensor data. Certain examples identify where sensors are connected to the network. In certain examples, knowing where a sensor is located (e.g., with respect to which equipment to be monitored, etc.) and what information the sensor is acquiring (e.g., vibration, temperature, light, sound, etc.) allows the system to tailor how to acquire and process sensor data from that sensor.

In certain examples, the homogenous, smart sensors are distinguishable only by their network address. Thus, one technological problem is identifying where each sensor is physically located on the machine, device, or other system being monitored. It is important to know where each sensor is located so that the sensor can be configured by the central control unit such that processing to be performed by that sensor is tailored to that sensor's location. Further, it is beneficial to associate results generated by a sensor with the correct part of the machine, system, etc., being monitored. Such location and dynamic, automated customization represents a technological improvement in system monitoring and sensor configuration not possible in prior approaches.

In certain examples, smart sensors of a given type can be allocated the same part number, irrespective of the specific monitoring function they are to perform. By allocating sensors of the same type the same part number, managing sensor stock and maintaining the sensors can be greatly simplified. However, assigning sensors having the same type the same part number creates difficulties in distinguishing between sensors and tracking particular sensor activity. Thus, certain examples automatically identify and classify homogenous smart sensors based on location, measurement, etc. A controller (e.g., a processor, microcontroller, microprocessor, and/or other computing device) can be used to trigger and/or otherwise facilitate application of a stimulus at or near a sensor, measure and/or otherwise receive a response from the sensor, and identify the sensor as at a certain location, certain type, etc.

For example, each sensor can be equipped with an accelerometer (e.g., a piezoelectric accelerometer, microelectromechanical (MEMS) accelerometer, etc.) to measure vibration in at least one axis. The sensors form a sensor network and are mounted on a machine, device, system, etc., which begins in an initial quiescent, vibration-free state, for example. The controller triggers a sensor detect mode. When the controller enters the sensor detect mode, the controller broadcasts a message on the sensor network instructing each sensor to identify itself (e.g., provide sensor identification information such as network address and/or other identifier, etc.). Upon receiving the broadcast message, each sensor transmits its network address to the controller. The controller then instructs each sensor to enter a monitoring state (e.g., a vibration monitoring state, temperature monitoring state, noise monitoring state, etc.), in which each sensor records a signal value measured by the sensor. For example, a sensor can record the value of a maximum amplitude of a vibration signal measured by the sensor. Then a stimulus (e.g., a percussion or vibrational stimulus, sound stimulus, temperature stimulus, etc.) is applied to one or more sensors to be identified (e.g., by the controller, by a person, via an external device, through environment condition, etc.). The controller then polls each sensor for feedback regarding the signal level recorded (and/or listens for pushed feedback). A sensor having a highest recorded value (e.g., highest recorded amplitude, etc.) can then be associated with a known location on the machine, device, other system, etc. Alternatively or in addition, a type of stimulus (e.g., vibration, temperature, sound, etc.) can be associated with a sensor at a location based on strength of measured signal, for example.

Thus, certain examples provide systems and methods to identify a location of individual sensors in a network of homogeneous smart sensors. Certain examples provide systems and methods to associate a monitoring type with individual sensors in a network of homogenous smart sensors.

Figure 1:
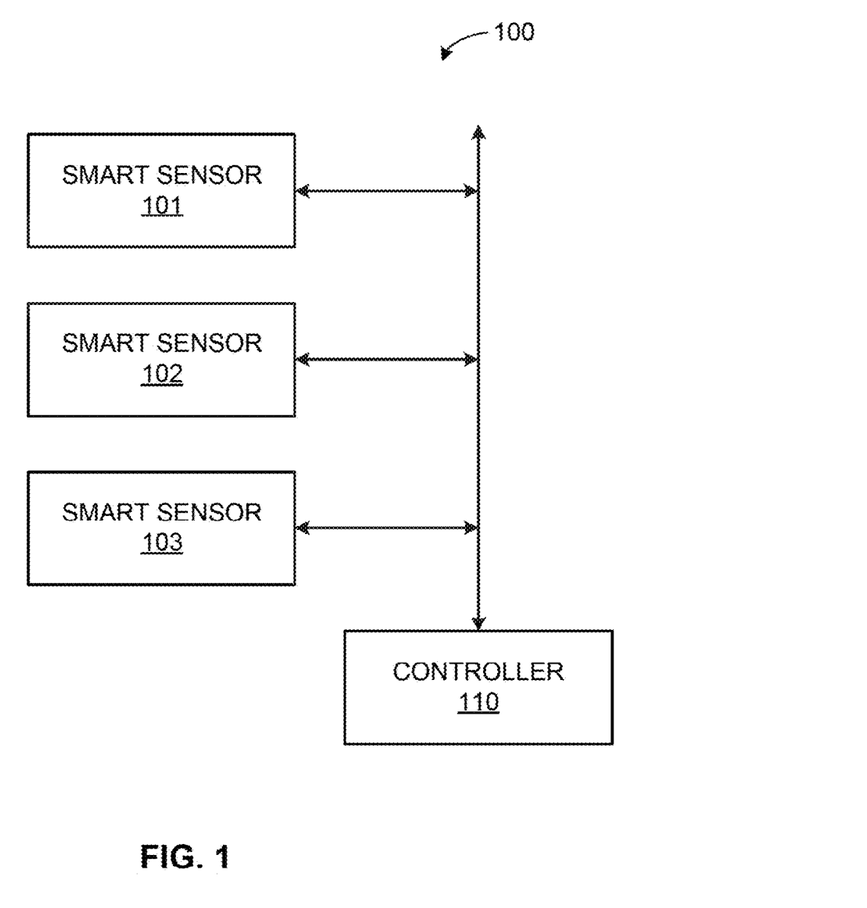
FIG. 1 illustrates an example sensor network or system.

FIG. 1 illustrates an example sensor network or system 100 including a plurality of smart sensors 101-103 in communication with a controller 110 (e.g., a processor, microprocessor, microcontroller, and/or other computing device, etc.). The example controller 110 can transmit and/or trigger transmission and/or otherwise facilitate application of a stimulus/stimuli to one or more connected sensors 101-103 (e.g., via the controller 110, an external device, environmental condition, human operation, etc.) and can receive a response to the stimulus from each affected sensor 101-103, for example. The example controller 110 can configure and/or facilitate configuration of the sensors 101-103 based on stimulus, response, location, and/or other parameter, etc. The example controller 110 can map the network 100 of sensors based on stimulus, response, location, etc.

In certain examples, the controller 110 instructs the sensors 101-103 to enter a detection mode. In the detection mode, each sensor 101-103 provides sensor identification information such as its (unique) network address to the controller 110. The controller 110 triggers, facilitates, and/or otherwise awaits a physical stimulus experienced by some or all of the sensors 101-103, and the sensor(s) 101-103 report back a measured response (e.g., measured vibration level, temperature, volume, pressure, light intensity, etc.) to the controller 110. The controller 110 identifies which network address/sensor 101-103 measured the highest value (e.g., vibration level, temperature, volume, pressure, light intensity, etc.) in response to the stimulus. Such a response can indicate that the sensor 101-103 is closest to a particular stimulus location (e.g., on an engine, engine gearbox, engine support, fuselage, etc.). The controller 110 then assigns that sensor 101-103 to a specific installation location (e.g., such as by selecting from a list of predefined options (e.g., engine 1 nose gearbox, etc.), etc.). In certain examples, the controller 110 can assign that sensor 101-103 a specific function (e.g., measure vibration at the location, measure temperature at the location, measure volume at the location, measure pressure at the location, measure light intensity at the location, etc.). In certain examples, the controller 110 sends a location specific configuration to the identified sensor 101-103 that defines how to acquire, process, and distribute sensor data. A map of the network 100 of sensors 101-103 can thus be constructed to configure the sensors 101-103 and provide the sensor/location/data mapping to the controller 110 and/or an external system (e.g., flight control, flight management, maintenance, control tower, ground, etc.). Thus, the controller 110 may not initially know how many sensors 101-103 are present, where they are located, and/or what they can measure, but can determine some or all of these elements through discovery and stimulation of the sensors 101-103, for example. For example, if ten sensors are placed in an engine gearbox having ten gears, the controller 110 can determine which of sensor corresponds to which gear in the gearbox based on network address and stimulus response.

Figure 2:
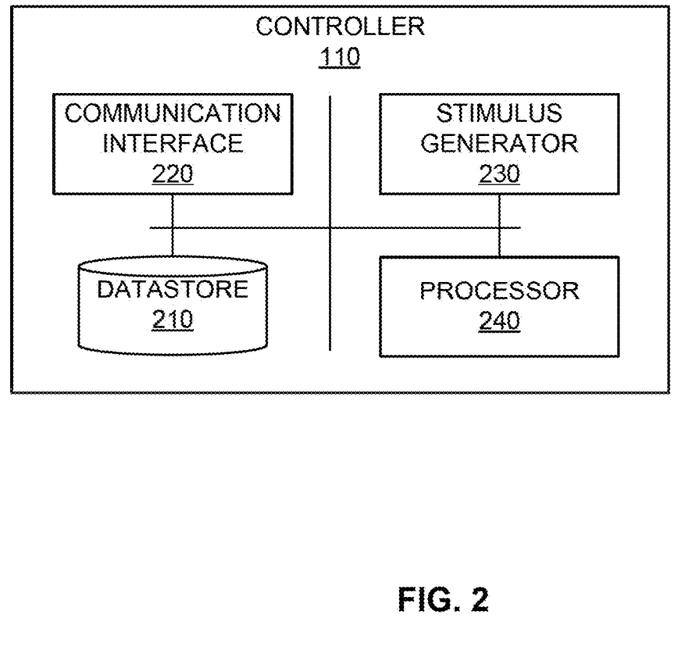
FIG. 2 illustrates an example implementation of the controller of FIG. 1.

FIG. 2 illustrates an example implementation of the controller 110 of FIG. 1. The example controller 110 of FIG. 2 includes a datastore 210, a communication interface 220, a stimulus generator 230, and a processor 240.

The example datastore 210 can store stimulus information/trigger, sensor 101-103 stimulus response data, sensor 101-103 configuration information, controller 110 configuration information, etc. The example datastore 210 can be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example datastore 210 can additionally or alternatively be implemented by one or more double data rate (DDR) memories, such as DDR, DDR2, DDR3, DDR4, mobile DDR (mDDR), etc. The example datastore 210 can additionally or alternatively be implemented by one or more mass storage devices such as hard disk drive(s), compact disk drive(s) digital versatile disk drive(s), solid-state drives, etc. While in the illustrated example the datastore 210 is illustrated as a single datastore, the datastore 210 can be implemented by any number and/or type(s) of datastores.

The example communication interface 220 facilitates communication between the controller 110 and the sensors 101-103, for example. The communication interface 220 can also facilitate communication between the controller 110 and an external system such as a flight management system, maintenance system, cloud-based records/service system, ground control system, etc.

In the illustrated example of FIGS. 1-2, the network connecting the sensors 101-103 and the controller 110 is a bus and/or a computer network. For example, the network can be an internal controller bus, a process control network, a direct wired connection to an interface of the sensors 101-103, etc. In some examples, the network is a network with the capability of being communicatively coupled to the Internet. However, the network can be implemented using any suitable wired and/or wireless network(s) including, for example, one or more data buses, one or more Local Area Networks (LANs), one or more wireless LANs, one or more cellular networks, one or more fiber optic networks, one or more satellite networks, one or more private networks, one or more public networks, etc. The network can enable the controller 110 to be in communication with the sensors 101-103, a control system of an aircraft, etc.

The example stimulus generator 230 can be used to generate a stimulus for one or more sensors 101-103, trigger an external stimulus to be provided to one or more sensors 101-103, ready sensor(s) 101-103 in a mode (e.g., a monitoring mode, etc.) to receive a stimulus, etc. The stimulus generator 230 can be configured based on information from the data store 210, external information provided via the communication interface 220, etc.

The example processor 240 can be used to control the datastore 210, communication interface 220, and/or stimulus generator 230, for example. For example, the processor 240 can be used to retrieve information, settings, etc., from the datastore 210, send and/or receive data via the communication interface 220, generate, trigger, and/or otherwise facilitate generation and/or application of stimulus via the stimulus generator 230, etc. The example processor 240 can process received feedback from the sensor(s) 101-103 to identify sensor 101-103 location, rank and/or otherwise evaluate sensor 101-103 response, classify the sensor 101-103, generate sensor 101-103 configuration information, etc.

Figure 3:
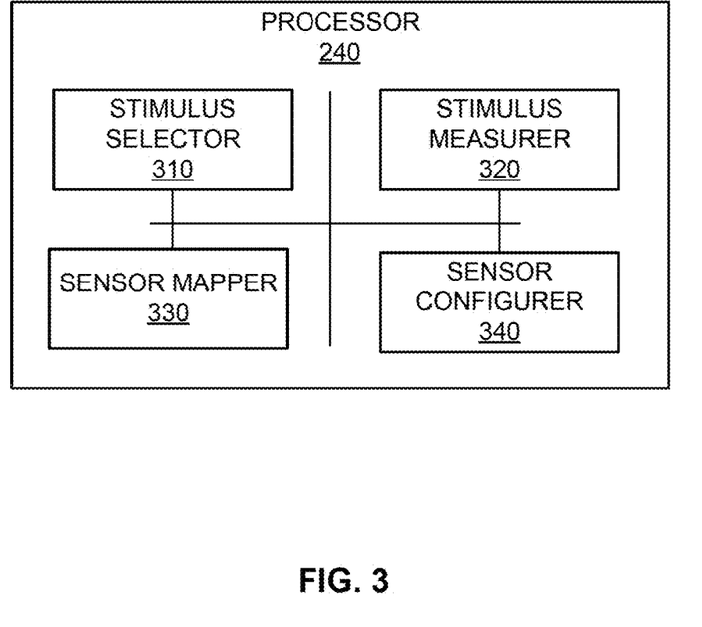
FIG. 3 illustrates an example implementation of the processor of FIG. 2.

FIG. 3 illustrates an example implementation of the processor 240 of FIG. 2. In the example of FIG. 3, the processor 240 includes a stimulus selector 310, a stimulus measurer 320, a sensor mapper 330, and a sensor configurer 340. The example stimulus selector 310 selects a stimulus to be applied to one or more sensors 101-103 (e.g., vibration, heat, cold, pressure, sound, light, etc.) and/or otherwise enables/facilitates application of the stimulus (e.g., via external device, environmental conditions (e.g., engine operation, temperature, etc.), human application, etc.). The example stimulus measurer 320 measures a received response to the stimulus from sensor(s) 101-103. The example sensor mapper 330 maps the sensors 101-103 in the sensor network 100 based on output from the stimulus measurer 320 and an indication of sensor 101-103 location, identifier, etc. The example sensor configurer 340 generates a configuration for the sensor(s) 101-103 based on the sensor 101-103 stimulus response, location, identifier, etc. Thus, the sensor mapper 330 can map sensors 101-103 in the network and the sensor configurer 340 can generate sensor 101-103 configuration based on the stimulus response, location, identifier, etc.

While example implementations of the sensor network/system 200 are illustrated in FIGS. 1-3, one or more of the elements, processes, and/or devices illustrated in FIGS. 1-3 can be combined, divided, re-arranged, omitted, eliminated, and/or implemented in other ways. Further, one or more elements, processes, and/or devices illustrated in FIGS. 1-3, and/or, more generally, the example sensor system 100 of FIGS. 1-3 can be implemented by hardware, software, firmware, and/or any combination of hardware, software, and/or firmware. Thus, for example, any of the one or more elements, processes, and/or devices illustrated in FIGS. 1-3, and/or, more generally, the example sensor system 100 of FIGS. 1-3 can be implemented by one or more analog or digital circuit(s), logic circuits, programmable processor(s), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the one or more elements, processes, and/or devices illustrated in FIGS. 1-3, and/or, more generally, the example sensor system 100 of FIGS. 1-3 is/are hereby expressly defined to include a tangible computer readable storage device or storage disk such as a memory, a digital versatile disk (DVD), a compact disk (CD), a Blu-ray disk, etc., storing the software and/or firmware. Further still, the example sensor system 100 of FIGS. 1-3 can include one or more elements, processes, and/or devices in addition to, or instead of, those illustrated in FIGS. 1-3, and/or may include more than one of any or all of the illustrated elements, processes, and devices.

While an example manner of implementing the sensor network/system 100 is illustrated in FIGS. 1-3, one or more of the elements, processes and/or devices illustrated in FIG. 1-3 can be combined, divided, re-arranged, omitted, eliminated, and/or implemented in any other way. Further, the elements of FIGS. 1-3 can be implemented by hardware, software, firmware, and/or any combination of hardware, software, and/or firmware. Thus, for example, any of the example elements of FIGS. 1-3 can be implemented by one or more analog or digital circuit(s), logic circuits, programmable processor(s), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the components of example FIGS. 1-3 is/are hereby expressly defined to include a tangible computer readable storage device or storage disk such as a memory, a digital versatile disk (DVD), a compact disk (CD), a Blu-ray disk, etc., storing the software and/or firmware. Further still, the example system 100 of FIGS. 1-3 can include one or more elements, processes, and/or devices in addition to, or instead of, those illustrated in FIGS. 1-3, and/or may include more than one of any or all of the illustrated elements, processes, and devices.

Flowcharts representative of example methods for implementing the example sensor network of FIGS. 1-3 are shown in FIGS. 4-7. In these examples, the methods can be implemented using machine-readable instructions that comprise a program for execution by a processor such as the processor 812 shown in the example processor platform 800 discussed below in connection with FIG. 8. The program may be embodied in software stored on a tangible computer readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowcharts illustrated in FIGS. 4-7, many other methods of implementing the example sensor system 100 can alternatively be used. For example, the order of execution of the blocks may be changed, and/or some of the blocks described may be changed, eliminated, or combined.

As mentioned above, the example methods of FIGS. 4-7 can be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM), and/or any other storage device or storage disk in which information is stored for any duration (e.g., for extended time periods, permanently, for brief instances, for temporarily buffering, and/or for caching of the information). As used herein, the term tangible computer-readable storage medium is expressly defined to include any type of computer-readable storage device and/or storage disk and to exclude propagating signals and to exclude transmission media. As used herein, "tangible computer-readable storage medium" and "tangible machine-readable storage medium" are used interchangeably. Additionally or alternatively, the example methods of FIGS. 4-7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Comprising and all other variants of "comprise" are expressly defined to be open-ended terms. Including and all other variants of "include" are also defined to be open-ended terms. In contrast, the term consisting and/or other forms of consist are defined to be close-ended terms.

Figure 4:
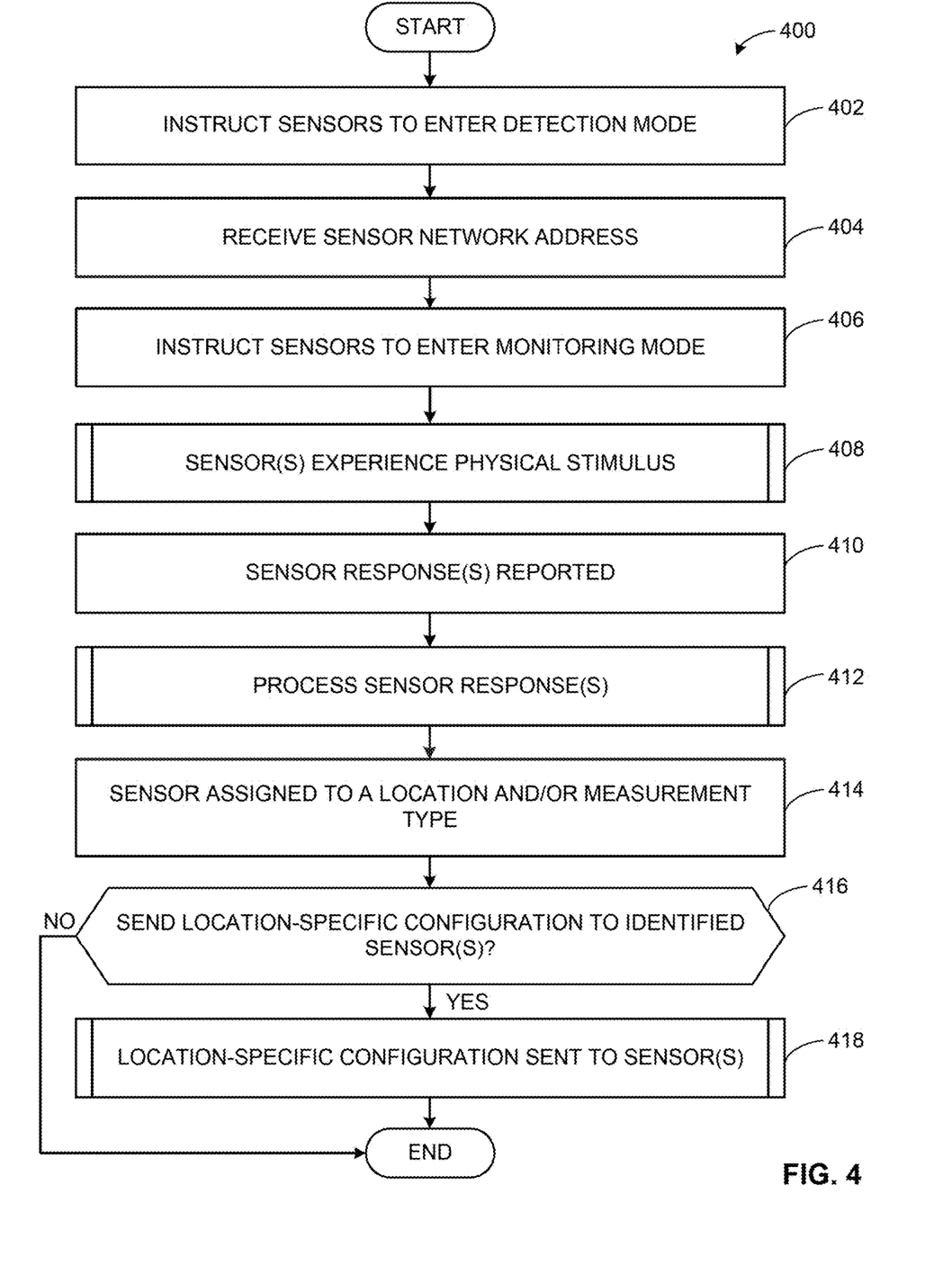
FIGS. 4-7 are flowcharts representative of example methods that can be executed to stimulate and configure the sensors 101-103 of FIGS. 1-3.

FIG. 4 is a flowchart representative of an example method that can be performed by the example system 100 of FIGS. 1-3 to stimulate and configure the sensors 101-103 of FIGS. 1-3. The example method begins at block 402, at which the controller 110 instructs the sensors 101-103 to enter a detection mode. For example, the controller 110 transmits a command, parameter, and/or other signal via its communication interface 220 to one or more sensors 101-103 to put, trigger, and/or otherwise instruct the sensors 101-103 in a detection mode (e.g., a configuration mode, etc.).

At block 404, network address information for the sensor(s) 101-103 is provided to the controller 110 via the communication interface 220. In response to a broadcast command from the controller 110 for sensors 101-103 to enter the detection mode, the sensors 101-103 provide sensor identification information such as their address and/or other identifying information to the controller 110 so that the controller 110 can communicate with individual and/or group(s) of the sensors 101-103, for example. For example, an Internet Protocol (IP) address and/or other location indicator assigned to each sensor 101-103 is provided to the controller 110. The controller 110 can create a map or network of available sensors 101-103 based on the sensor identification information (e.g., address/indicator, etc.), for example. For example, the sensor mapper 330 can generate a sensor address map and store the map in the datastore 210. Thus, the controller 110 can communicate with each sensor 101-103 (e.g., send messages, commands, data, etc.) by addressing each sensor 101-103 and/or broadcasting to all sensors 101-103 on the network 100, for example.

At block 406, the sensor(s) 101-103 are instructed to enter a monitoring mode. For example, after the controller 110 has received address information from the available sensors 101-103 and can communicate directly with each sensor 101-103 (e.g., instead of and/or in addition to a network broadcast message, etc.), the controller 110 instructs the sensor(s) 101-103 to shift from the detection mode or state to a monitoring mode or state. Thus, rather than evaluating their address and/or other sensor identification information, the sensor(s) 101-103 are instead awaiting and/or otherwise monitoring for a stimulus.

At block 408, one or more physical stimuli are applied to one or more of the sensors 101-103. For example, one or more of a vibration, temperature, pressure, sound, light, etc., can be generated and/or otherwise triggered by the controller 110 (e.g., via the stimulus generator 230, an external stimulus generator, via human application, and/or based on an environmental condition such as engine operation, temperature, etc.) for the sensor(s) 101-1013. For example, a vibrational stimulus can be applied to an engine support component, a temperature stimulus can be applied to the engine (e.g., via engine ignition, throttling, etc.), a sound stimulus can be applied to the aircraft, etc. Sensor(s) 101-103 within range of the applied stimulus detect that stimulus to varying degrees, for example. In certain examples, varying stimuli can be applied to varying sensor(s) 101-103. In other examples, the same stimulus can be applied to multiple sensor(s) 101-103. For example, a vibration signal can be applied to all sensors 101-103, and each sensor 101-103 records the value of a maximum amplitude of the vibration signal measured by the respective sensor 101-103.

At block 410, a response from the sensor(s) 101-103 is reported. For example, a measurement obtained by the sensor(s) 101-103 in response to the stimulus is provided to the controller 110. Thus, an energy level, frequency range, numerical measurement value, etc., can be provided from the sensor(s) 101-103 to the controller 110 via the network 100 (e.g., via the communication interface 220, etc.).

At block 412, response(s) from the sensor(s) 101-103 are processed by the controller 110 to determine which sensor 101-103 had the strongest response to a particular stimulus. For example, a particular vibrational stimulus was applied to an engine and detected by all sensors 101-103. However, each sensor 101-103 detected a different vibrational strength because each sensor 101-103 was located in a different position with respect to the engine (e.g., on different parts of the aircraft, tower, etc.). The controller 110 analyzes the response data from each sensor 101-103 (e.g., using the stimulus measurer 320, etc.) to determine that sensor 102 detected the strongest vibration from the stimulus. The controller 110 determines that sensor 102 is located closest to the engine because it measured the highest level of vibration in response. If sensor 101 detected the weakest vibration among the sensors 101-103, the controller 110 can determine that sensor 101 is farthest and/or otherwise most obstructed from the engine among the sensors 101-103, for example. Alternatively or in addition, the controller 110 can determine a location for each sensor 101-103 from a list of known possible locations (e.g., engine 1 nose gearbox, engine 2 support, etc.) based on how each sensor 101-103 responded to/recorded the stimulus (e.g., strength of response, value of response, timing of response, etc.).

At block 414, the sensor 101-103 having the strongest (e.g., "best", most accurate, etc.) response to a given stimulus is assigned to a particular location (e.g., engine, support, fuselage, etc.) and/or type of measurement (e.g., vibration, temperature, light, sound, pressure, etc.), etc. For example, the controller 110 can map out (e.g., using the sensor mapper 330, etc.) a physical location corresponding to each sensor 101-103 based on that sensor's response to the stimulus (e.g., the map or network of sensor 101-103 addresses is combined with a map of environment locations (e.g., engine, support, gearbox, fuselage, etc.). That is, knowing where a stimulus was applied (e.g., an engine, support, gearbox, fuselage, etc.) and which sensor 101-103 responded most strongly/accurately to that stimulus allows the controller 110 to map each sensor 101-103 to a location (e.g., a location on/in an aircraft, etc.), such as via the sensor configure 340, etc. Alternatively or in addition, the sensor 101-103 that detected the strongest vibration from a stimulus applied to the engine (e.g., engine ignition, etc.) is designated (e.g., using the sensor configure 340, etc.) as an engine vibration sensor. The sensor 101-103 that detected the most accurate temperature reading is assigned to be an engine temperature monitoring sensor, for example.

In certain examples, the controller 110 is to send a location-specific configuration (e.g., using the sensor configure 340, etc.) to one or more sensors 101-103 based on the designation of the sensor(s) 101-103 to monitor for a certain indication, at a certain location, etc. At block 416, the controller 110, the sensor(s) 101-103, and/or the location are evaluated to determine whether a configuration is to be sent to the relevant sensor(s) 101-103.

If a configuration is to be sent, then, at block 418, the controller 110 sends a location-specific configuration to the identified one or more sensors 101-103. The configuration defines how to acquire, process, and distribute the data, for example. The configured sensor(s) 101-103 are then configured by location, type/measurement, etc., to gather data and transmit data to the controller 110 to determine measurement value, etc. If no configuration is to be provided to sensor(s) 101-103, the process ends and ongoing monitoring/measurement can continue via the sensor(s) 101-103. When the controller 110 is to trigger the detection mode (e.g., periodically according to its programming, based on external command or trigger, etc.), the process begins again at block 402.

Figure 5:
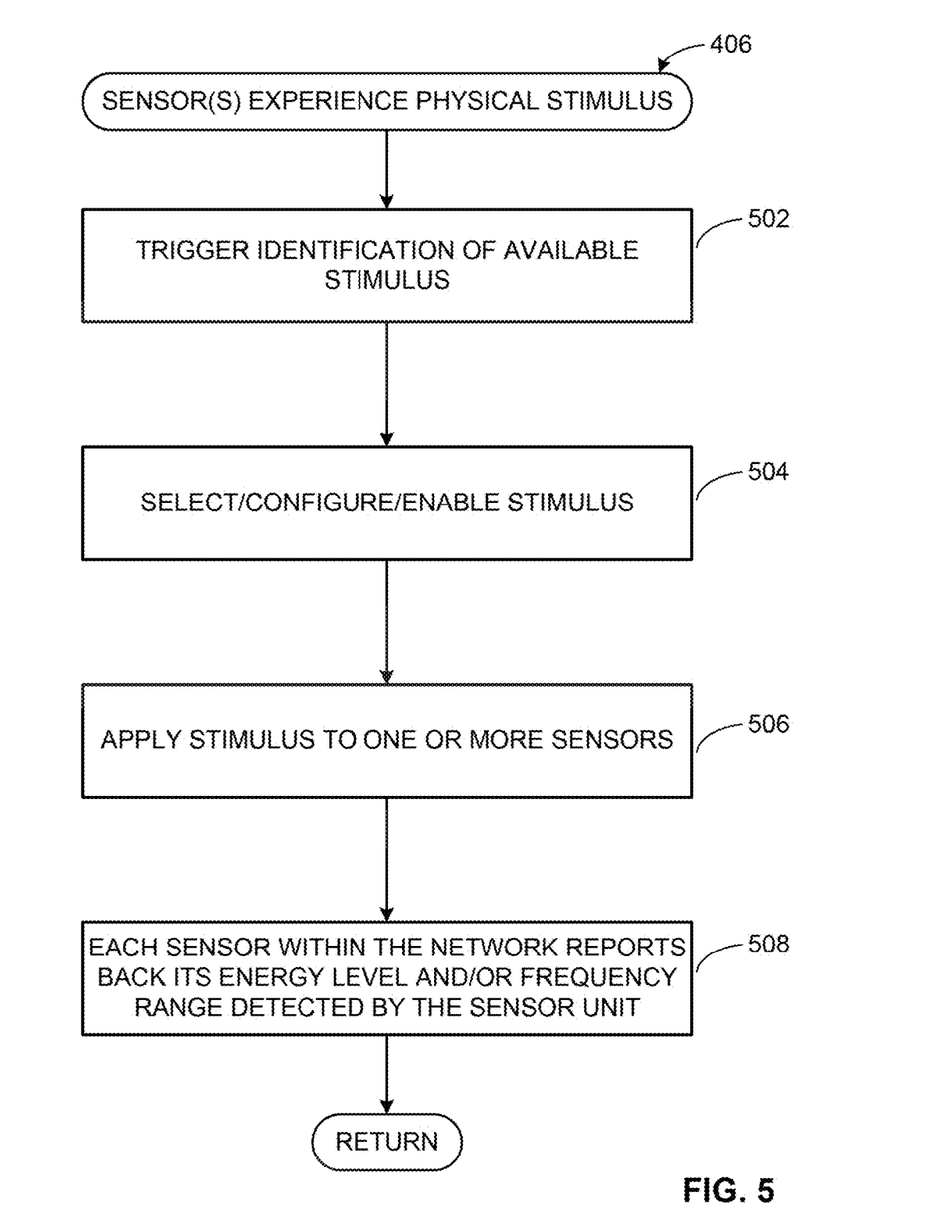

FIG. 5 provides additional detail regarding an example implementation of some or all of the sensors 101-103 experiencing physical stimulus (block 408 of the example of FIG. 4). FIG. 5 is a flowchart representative of an example method that can be performed by the sensor network system 100 of FIGS. 1-3 to provide one or more stimuli to one or more sensors 101-103.

At block 502, the transition from detection mode to monitoring mode triggers an identification of available stimulus/stimuli that can be applied to the sensor(s) 101-103. For example, the controller 110 can retrieve a vibration setting and/or other stimulus to be applied to one or more of the sensors 101-103. For example, the stimulus selector 310 can communicate with the stimulus generator 230 and/or other external stimulus generator to identify available stimulus(-i). In other examples, an environmental condition, such as engine operation, temperature, etc., can exposure sensor(s) 101-103 to stimulus. In other examples, a human operator can apply a stimulus to one or more sensors 101-103.

At block 504, the stimulus/stimuli is selected, configured, and/or otherwise enabled. For example, the stimulus selector 310 selects and/or otherwise configures an available stimulus(-i) to be generated by the stimulus generator 230 and/or other external stimulus generator. For example, the stimulus selector 310 configures a vibrational stimulus to be provided by the stimulus generator 230, etc. If an environmental and/or human-driven stimulus is to be applied, the stimulus may not need to be selected and/or otherwise configured, for example.

At block 506, the stimulus/stimuli is applied to all or part of the mapped network of sensors 101-103. For example, now that the controller 110 has mapped the sensors 101-103 by address and/or other sensor identification information, the stimulus generator 230 and/or other external stimulus generator, environmental condition, human operator, etc., can apply one or more stimuli to all or part of the set of sensors 101-103.

At block 508, the controller 110 is notified that the stimulus/stimuli has/have been applied. For example, the controller 110 receives an acknowledgement that the stimulus(-i) has been generated and output by the stimulus generator 230. Control then returns to block 410 to receive reported sensor response(s).

Figure 6:
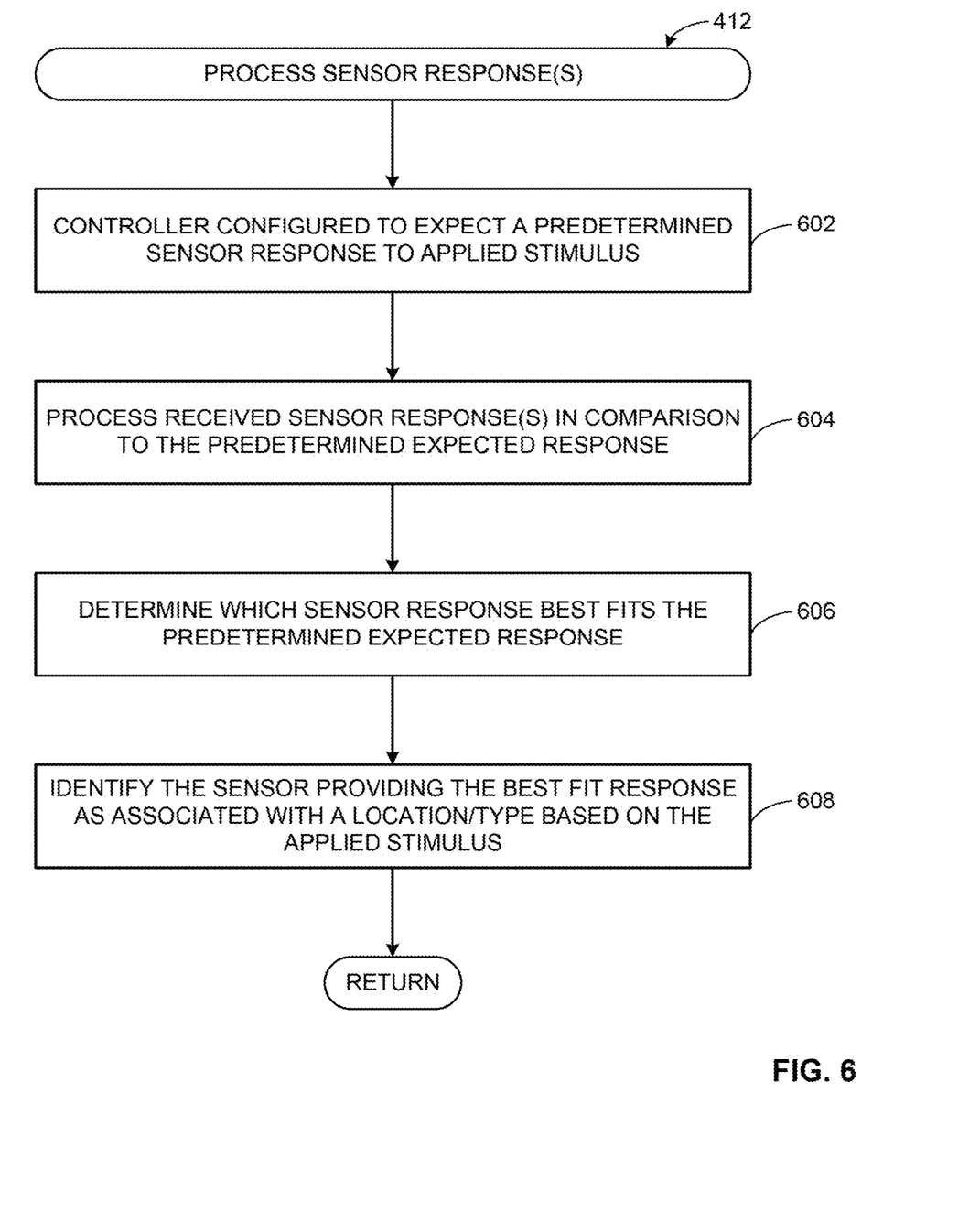

FIG. 6 provides additional detail regarding an example implementation of processing sensor response(s) (block 412 of the example of FIG. 4). FIG. 6 is a flowchart representative of an example method that can be performed by the sensor network system 100 of FIGS. 1-3 to process response(s) to the one or more stimuli received from the one or more sensors 101-103.

At block 602, the controller 110 is configured to expect a predetermined sensor response to the applied stimulus. For example, the controller 110 is configured to expect a certain vibration frequency, a certain pressure, a certain temperature, a certain light intensity, a certain sound frequency, etc.

At block 604, the controller 110 processes the received sensor response(s) in comparison to the predetermined expected sensor response. For example, the stimulus measurer 320 of the processor 240 analyzes the signal received via the communication interface 220 at the controller 110 to determine a value associated with the response. The stimulus measurer 320 can then compare the response value to the predetermined expected response value. At block 606, the controller 110 determines which sensor response best fits the predetermined expected response. For example, the processor 240 can compare a plurality of sensor responses to determine which sensor response best fits the predetermined expected sensor response. That is, when analyzing a delta or difference between an actual sensor response value and the predetermined expected sensor response value, the processor 240 identifies the sensor response with the smallest delta as the best fit sensor response.

At block 608, the controller 110 identifies the sensor 101-103 providing the best fit response as associated with a location and/or type of the applied stimulus. For example, the sensor address associated with the best fit sensor response can be used by the sensor mapper 330 to associate a particular sensor 101-103 with the best fit sensor response and therefore with a particular location and/or type associated with the applied stimulus that resulted in the best fit response. Control then returns to block 414 to assign the sensor 101-103 to a particular location and/or measurement type.

Figure 7:
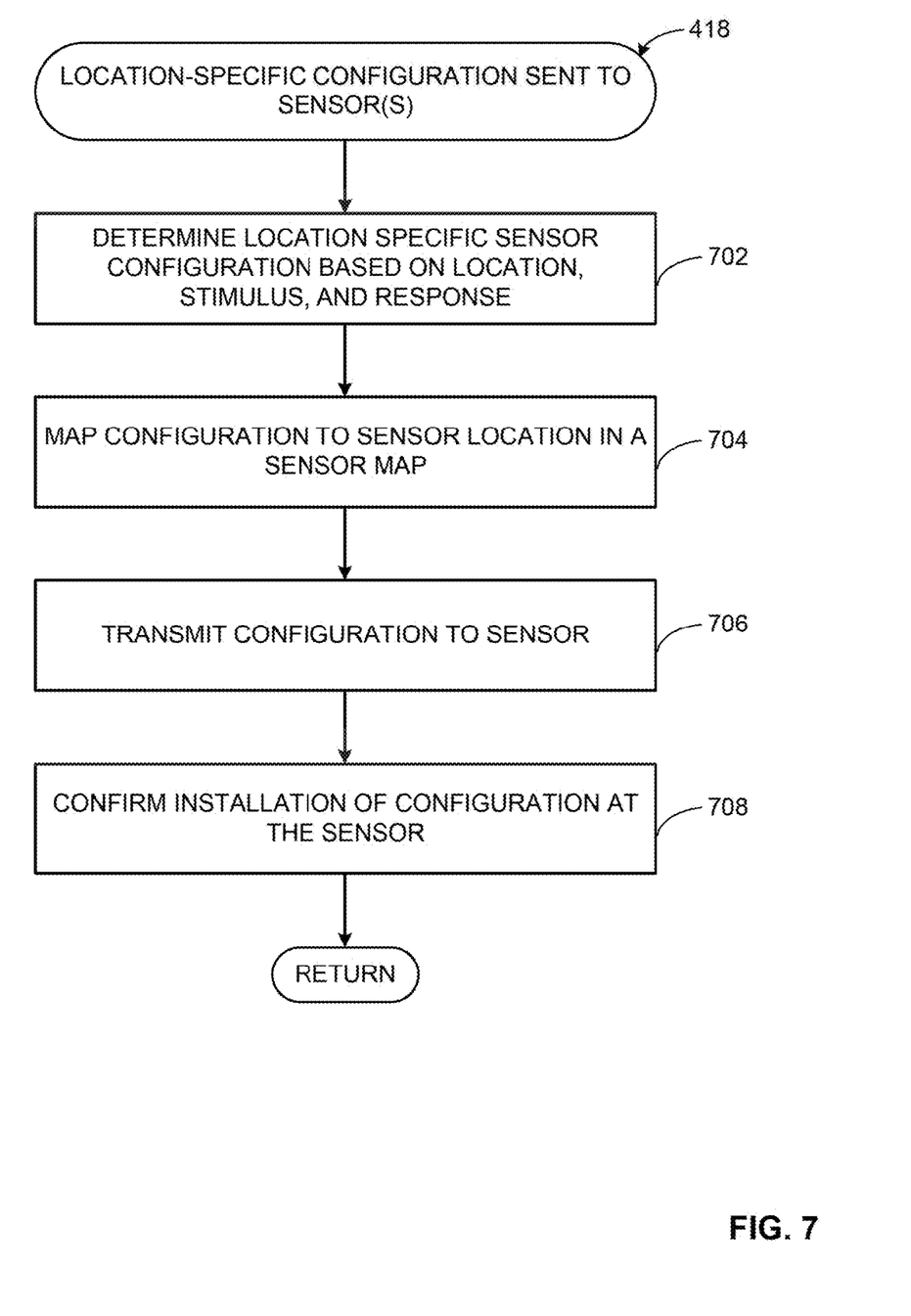

FIG. 7 provides additional detail regarding an example implementation of sending a location-specific configuration to one more sensors 101-103 (block 418 of the example of FIG. 4). FIG. 7 is a flowchart representative of an example method that can be performed by the sensor network system 100 of FIGS. 1-3 to provide a location-specific configuration to one or more sensors 101-103.

At block 702, a location- and/or measurement type-specification sensor configuration is determined based on sensor location, applied stimulus, and sensor response. For example, the sensor configurer 340 generates a configuration that defines how to acquire, process, and distribute a particular type of data (e.g., vibration, temperature, pressure, light, sound, etc.) at a location, for example.

At block 704, the configuration is mapped to the sensor location in the sensor map. For example, the sensor mapper 330 adds the configuration for the particular sensor 101-103 to the map of sensor address network information. Thus, the map identifies sensors 101-103 by address as well as location, monitoring type, and/or other configuration information.

At block 706, the configuration is transmitted to the sensor 101-103. Thus, the configured sensor(s) 101-103 are then configured by location, type/measurement, etc., to gather data and transmit data to the controller 110 to determine measurement value, etc.

At block 708, installation of the configuration at the sensor 101-103 is confirmed. For example, the sensor 101-103 returns a response or acknowledgement once the configuration has been received and installed and/or otherwise used to configure the sensor 101-103 for its measurement.

Thus, certain examples enable identification, configuration, and monitoring of a plurality of homogenous sensors. Certain examples overcome the onerous configuration of prior sensor systems to enable a dynamic, autonomous sensor identification, configuration, and monitoring. For example, a plurality of sensors can be installed and automatically identified based on location and measurement through application of stimulus. Such sensors can then be automatically identified by location and configured for certain measurement base on the location.

Figure 8:
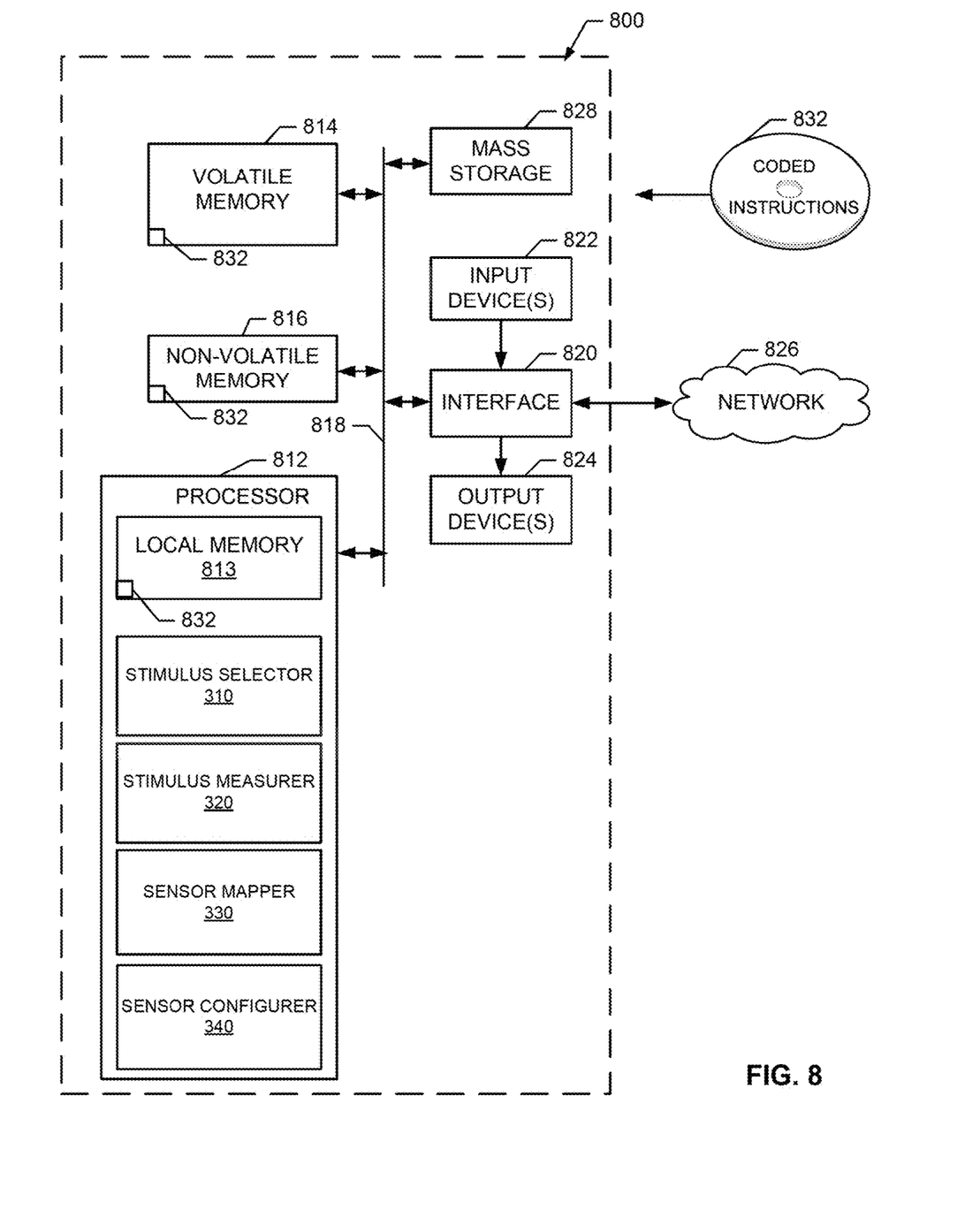
FIG. 8 is a block diagram of an example processing platform structured to execute machine-readable instructions to implement the methods of FIGS. 4-7 and/or the example sensor network of FIGS. 1-3.

FIG. 8 is a block diagram of an example processor platform 800 capable of executing instructions to implement the methods of FIGS. 4-7 and the example sensor network 100 of FIGS. 1-3. The processor platform 800 can be, for example, an electronic control unit (ECU), an electronic engine control (EEC) unit, a full-authority digital engine control (FADEC) unit, a flight management system (FMS), a server, a personal computer, or any other type of computing device or network of computing devices.

The processor platform 800 of the illustrated example includes a processor 812. The processor 812 of the illustrated example is hardware. For example, the processor 812 can be implemented by one or more integrated circuits, logic circuits, microprocessors, or controllers from any desired family or manufacturer.

The processor 812 of the illustrated example includes a local memory 813 (e.g., a cache). The processor 812 of the illustrated example executes the instructions to implement the example controller 110, datastore 210, communication interface 220, stimulus generator 230, processor 240, stimulus selector 310, stimulus measurer 320, sensor mapper 330, sensor configure 340, and, more generally, the example sensor system 100. The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 can be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, isopoint, and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip, or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, magnetic media, solid-state drives, compact disk drives, Blu-ray disk drives, RAID systems, and digital versatile disk (DVD) drives. The example mass storage 828 can implement the example datastore 210, for example.

Coded instructions 832 to implement the methods represented by the flowcharts of FIGS. 4-7 may be stored in the mass storage device 828, in the volatile memory 814, in the non-volatile memory 816, and/or on a removable tangible computer-readable storage medium such as a CD or DVD.

From the foregoing, it will be appreciated that the above disclosed methods, apparatus, and articles of manufacture implement improved identification and configuration of sensors. Certain examples facilitate automated provisioning of a plurality of homogenous smart sensors without time-consuming, error-prone manual identification and programming. Certain examples enable sensor networks to adapt to current environment conditions through automated identification of location and stimulus to configure the sensor network to monitor one or more environmental conditions in an area.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The invention claimed is:

1. An apparatus comprising:
a machine;
a plurality of sensors configured to monitor the machine; and
a central control unit communicatively coupled to the plurality of sensors and comprising a processor; and
a communication interface,
the processor configured to at least:
broadcast, using the communication interface, a request for sensor identification in a detection mode;
receive, using the communication interface, sensor identification information;
instruct, based on the sensor identification information, the plurality of sensors to enter a monitoring mode to await a stimulus;
receive, in response to a first stimulus applied to a first sensor of the plurality of sensors at a first location, a first sensor response to the first stimulus from the first sensor of the plurality of sensors;
evaluate the first sensor response with respect to an expected sensor response; and when the first sensor response satisfies a criterion, associate the first sensor of the plurality of sensors with the first location.

2. The apparatus of claim 1, wherein the criterion includes a best fit to the expected sensor response among a plurality of received sensor responses.

3. The apparatus of claim 1, wherein the sensor identification information includes a sensor network address.

4. The apparatus of claim 1, wherein the first stimulus includes at least one of a vibrational stimulus, a pressure stimulus, a temperature stimulus, a light stimulus, or a sound stimulus.

5. The apparatus of claim 1, wherein associating the first sensor of the plurality of sensors with the first location further includes associating the first sensor of the plurality of sensors with a first measurement type.

6. The apparatus of claim 5, wherein the first measurement type includes at least one of vibration, pressure, temperature, light, or sound.

7. The apparatus of claim 1, wherein the processor is further configured to send a first configuration to the first sensor of the plurality of sensors, the first configuration based on the first location and the first stimulus.

8. The apparatus of claim 7, further including:
generating a sensor map of a plurality of sensors in a sensor network based on the sensor identification information; and
updating the sensor map based on associating the first sensor of the plurality of sensors with the first location.

9. A method comprising:
providing:
a plurality of sensors configured to monitor a machine; and
a central control unit communicatively coupled to the plurality of sensors and comprising a processor;
broadcasting, using the processor, a request for sensor identification in a detection mode;
receiving, using the processor, sensor identification information;
instructing, using the processor based on the sensor identification information, the plurality of sensors to enter a monitoring mode to await a stimulus;
receiving, in response to a first stimulus applied to a first sensor of the plurality of sensors at a first location, a first sensor response to the first stimulus from the first sensor of the plurality of sensors;
evaluating, using the processor, the first sensor response with respect to an expected sensor response; and
when the first sensor response satisfies a criterion, associating the first sensor of the plurality of sensors with the first location.

10. The method of claim 9, wherein the criterion includes a best fit to the expected sensor response among a plurality of received sensor responses.

11. The method of claim 9, wherein the sensor identification information includes a sensor network address.

12. The method of claim 9, wherein the first stimulus includes at least one of a vibrational stimulus, a pressure stimulus, a temperature stimulus, a light stimulus, or a sound stimulus.

13. The method of claim 9, wherein associating the first sensor of the plurality of sensors with the first location further includes associating the first sensor of the plurality of sensors with a first measurement type.

14. The method of claim 13, wherein the first measurement type includes at least one of vibration, pressure, temperature, light, or sound.

15. The method of claim 9, further including sending a first configuration to the first sensor of the plurality of sensors, the first configuration based on the first location and the first stimulus.

16. The method of claim 15, further including:
generating a sensor map of a plurality of sensors in a sensor network based on the sensor identification information; and
updating the sensor map based on associating the first sensor of the plurality of sensors with the first location.

17. A tangible computer-readable storage medium comprising instructions which, when executed, cause a machine to at least:
broadcast a request for sensor identification corresponding to a plurality of sensors in a detection mode;
receive sensor identification information;
instruct, based on the sensor identification information, the plurality of sensors to enter a monitoring mode to await a stimulus;
receive, in response to a first stimulus applied to a a first sensor of the plurality of sensors at a first location, a first sensor response to the first stimulus from the first sensor of the plurality of sensors;
evaluate the first sensor response with respect to an expected sensor response; and
when the first sensor response satisfies a criterion, associate the first sensor of the plurality of sensors with the first location.

18. The tangible computer-readable storage medium of claim 17, wherein the criterion includes a best fit to the expected sensor response among a plurality of received sensor responses.

19. The tangible computer-readable storage medium of claim 17, wherein the instructions, when executed, further cause the machine to send a first configuration to the first sensor of the plurality of sensors, the first configuration based on the first location and the first stimulus.

20. The tangible computer-readable storage medium of claim 19, wherein the instructions, when executed, further cause the machine to:
generate a sensor map of a plurality of sensors in a sensor network based on the sensor identification information; and
update the sensor map based on associating the first sensor of the plurality of sensors with the first location.

* * * * *